W. C. RENSHAW.
AIR BRAKE OPERATING MECHANISM.
APPLICATION FILED APR. 3, 1915.
1,216,841.
Patented Feb. 20, 1917.
2 SHEETS—SHEET 2.
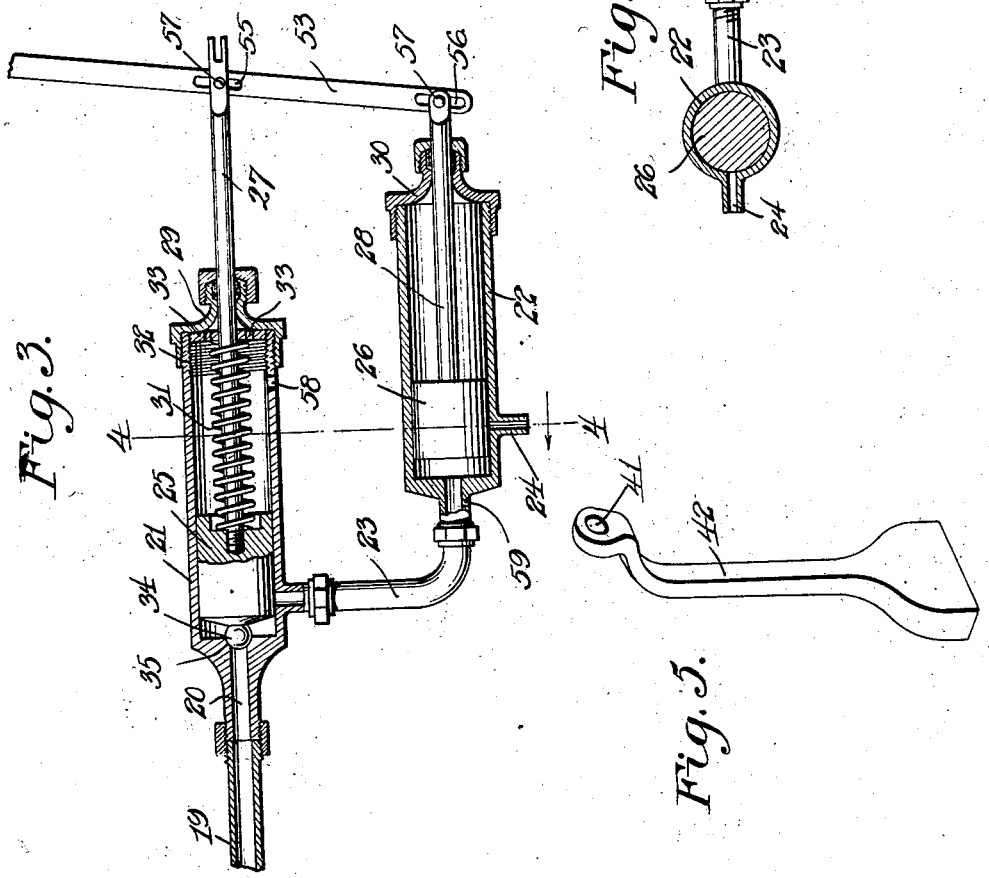

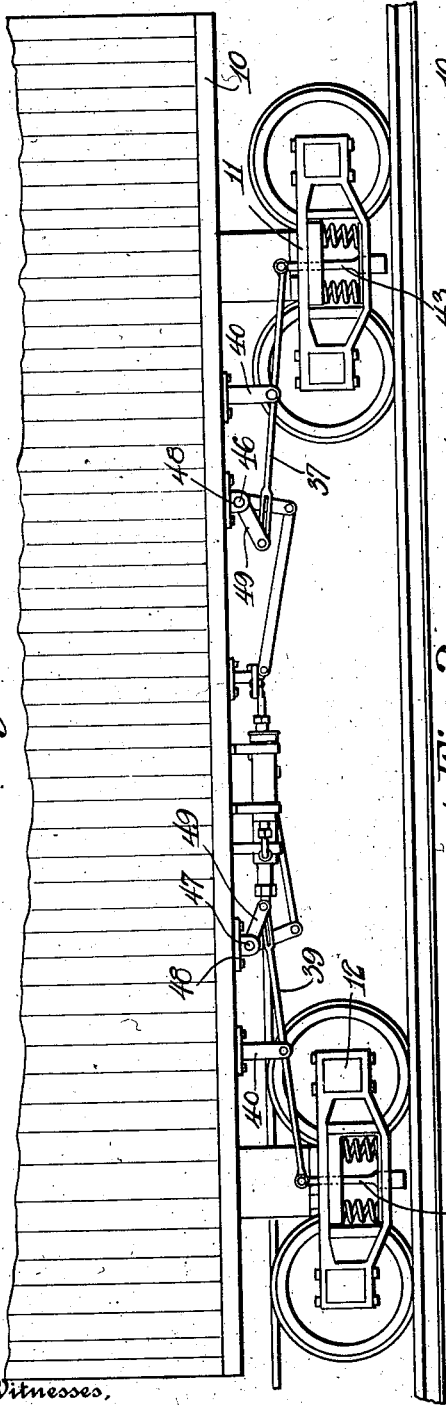

UNITED STATES PATENT OFFICE.

WILLIAM C. RENSHAW, OF MANNINGTON, WEST VIRGINIA.

AIR-BRAKE-OPERATING MECHANISM.

1,216,841.  Specification of Letters Patent.  Patented Feb. 20, 1917.

Application filed April 3, 1915. Serial No. 18,927.

*To all whom it may concern:*

Be it known that I, WILLIAM C. RENSHAW, a citizen of the United States, residing at Mannington, in the county of Marion and State of West Virginia, have invented certain new and useful Improvements in Air-Brake-Operating Mechanisms, of which the following is a specification.

This invention relates to an improved means for applying the brakes of a railway car in case the car should jump the track and the principal object of the invention is to provide improved means for exhausting the air from the pipe line forming part of the standard air brake system used upon railway trains.

Another object of the invention is to so construct this mechanism that the same may be caused to operate no matter which truck jumps the track and also no matter in which direction it moves.

Another object of the invention is to so construct the mechanism referred to that the tappets forming part of the same will be moved to a safe position after first engaging the rails or ties to set the mechanism in operation.

Another object of the invention is to so construct the same that it may be readily applied to air-brake systems of the standard type now used thus making it unnecessary to have any particular type of air-brake system in order to apply the device to cars already in use.

Another object of the invention is to provide a mechanism which will be comparatively simple in construction and easy to operate and to also provide one which will not readily get out of order or need repair.

This invention is illustrated in the accompanying drawings, wherein:—

Figure 1 is a view showing the operating mechanism applied to a car, part of the air-brake system being removed for the sake of clearness.

Fig. 2 is a view showing a car in bottom plan with the operating mechanism connected with an air-brake system representing a standard type of air-brake system.

Fig. 3 is an enlarged sectional view of a portion of the operating mechanism.

Fig. 4 is a sectional view taken along the line 4—4 of Fig. 3.

Fig. 5 is a perspective view of one of the tappets forming part of this invention.

The car shown in Figs. 1 and 2 is a freight car but it is understood that this simply represents any car desired and that it may be either the freight car shown or a passenger coach, a tank car or any other type of car. This car is provided with the trucks 11 and 12 which will be of the standard construction and are only designated in general in the views without regard to any special detailed construction. The air-brake system is also of the standard type and includes the brake beams 13 carried by the trucks, the auxiliary air reservoir 14, the brake cylinder 15, the pipe line 16 connecting the auxiliary air reservoir with the brake cylinder and the air pipes 17 and 18. It will of course be understood that the air-brake system thus far described is not shown in complete detailed construction but is simply designated in general in order to show the relation of the operating mechanism to be hereinafter described to the standard air-brake system.

It very often happens that a truck will jump the track, in which case it is necessary that the brakes be applied as soon as possible. As a general rule it is necessary for the engineer or the conductor to turn the proper valve in order to exhaust the air from the train line of the cars and as this takes time the mechanism forming the subject matter of this invention has been provided. With the mechanism provided as soon as the truck leaves the track the tappets forming part of the same will engage the rails or ties and will move to a position causing the mechanism to be thrown into operation as will be hereinafter brought out in detail.

The pipe 19 which will be known hereafter as a drain pipe leads from the pipe 17 and communicates with the spout or nozzle 20 of the cylinder 21 forming part of this system and which will be hereafter known as the main cylinder. The cylinder 22 which will be known hereafter as the auxiliary cylinder is connected with the main cylinder by means of the conduit pipe 23. From an inspection of Fig. 3 it will be readily seen that air entering the main cylinder 21 may pass through the conduit 23 into the auxiliary cylinder 22 from which it will pass through the outlet 24. Referring to this Fig. 3 it will also be seen that pistons 25 and 26 are slidably mounted in the cylinders 21 and 22 respectively and are provided with rods 27 and 28 which pass out through the heads 29 and 30 of the cylinders. In order to permit the piston 25 to be returned to its normal position there has been provided a spring 31 positioned about the piston rod 27 between the piston 25 and the abutment disk 32 which disk is adjustably mounted in the cylinder by means of the threaded engagement with the cylinder. In order to permit the disk to be rotated and thereby adjusted in the cylinder, recesses 33 have been provided to permit a wrench provided with teeth to engage the disk. It should be noted that the piston 25 is provided with an extension or globular knob forming a valve head 34 which fits into the valve seat 35 at the inner end of the passage-way formed in the nozzle 20 and that therefore when the valve is in place the air in the pipe line forming the air-brake system cannot move the piston in the cylinder 21 against the tension of the spring 31.

The levers 36, 37, 38 and 39 which form part of the mechanism to be hereinafter known as actuating mechanism for the initial starting of the pistons are pivotally supported by means of the hanger brackets 40 and are pivotally connected at their outer ends with the eyes 41 of the tappets 42, 43, 44 and 45. These tappets are positioned between the wheels of the truck as shown in Fig. 1 and it will thus be seen that when the truck jumps the track one or more of the tappets will engage the rails or ties or other part of the road bed and thus swing the levers to rock either the rocker bar 46 or 47. These rocker bars 46 and 47 are rotatably mounted in the bearings 48 and are provided with arms 49, carrying pins slidably mounted in the slots formed in the inner end portions of the levers as shown in Fig. 1. Links 50 and 51 are pivotally connected with the arms 52 carried by the rocker shafts 46 and 47 so that when the links are moved longitudinally these rocker shafts will be rotated to raise or lower the tappets according to the direction in which the rocker shafts move. The actuating lever 53 for the draw bars 50 and 51 is pivotally mounted by means of the bearings 54 and has one end portion connected with the inner end of the draw bar 50. The opposite end portion is provided with longitudinally extending slots 55 and 56 so that the piston rods 27 and 28 may be connected with actuating lever 53 by means of the pins 57. It is necessary that the opening 58 through which these pins pass be elongated so that when the actuating lever moves upon its pivot 54 sufficient play will be given to prevent binding. From an inspection of Fig. 3 it will be noted that the piston rod 27 extends beyond the actuating lever 53 and from an inspection of Fig. 2 it will be seen that the inner end of the link 51 is connected with the extended end of this piston rod 27. Therefore when the actuating lever 53 is moved the links 50 and 51 and the piston rods 27 and 28 are also moved.

The operation of this mechanism is very simple and is as follows. The cars forming the train are connected in the usual manner and the pipes 17 and 18 on adjoining cars are also coupled in the usual manner thus permitting the air from the main storage tanks of the standard air-brake system to pass through the system and of course fill the auxiliary air reservoir of the car. When the train is running in the usual manner this mechanism will remain inactive but if one of the trucks should jump the track one or both of the tappets carried thereby will be raised by engagement with the rail or with one of the ties thus rocking the lever carrying the tappet and through the medium of this lever will rotate the rocker shaft with which it is connected. Since each of the rocker shafts is connected with the actuating lever 53 the lever will be moved a certain amount thus drawing upon the pistons 27 and 28. It has already been pointed out that under normal circumstances the valve head 34 will be seated upon the valve seat 35 and therefore the air in the pipe 19 and nozzle 20 will not be able to move the piston 35 against the tension of the spring 31. As soon, however, as the actuating lever is moved to draw the piston rods 27 and 28 outwardly the valve head will be moved out of engagement with the seat 35 and the compressed air will enter the cylinder 21 and will move the pistons longitudinally in the cylinder until the entrance to the pipe 23 is uncovered. In order to prevent an air cushion from being formed in the cylinder 21 and thus preventing the piston from moving properly there is provided a vent 58 through which the air in the cylinder may pass when the piston moves toward the head 29. When the pistons are moved toward the heads 29 and 30, the air passing out of pipe 19 will first enter cylinder 21 to act upon piston 25 and will then pass through pipe 23 into the cylinder 22 where it will act upon the piston 26 and move the same through the cylinder 22. Therefore both the piston 25 and the piston 26 will be moved simultaneously after the air enters the cylinder 22 and therefore the actuating lever will be swung rapidly thus rotating the rocker shafts 46 and 47 and swinging the levers 36, 37, 38 and 39 to draw the tappets upwardly thus preventing them from being broken. All of this operation will be completed within a very short space of time and as soon as the piston 26 moves past the outlet 24 the air will be exhausted from the air-brake system and the brakes will then be applied in the usual manner. Since this mechanism is only to be operated in case a car jumps the track it will be readily seen that this device is an emergency device and that therefore it will not operate when the train is running properly and thus there will be no danger of the brakes being applied inadvertently. After the train has been brought to a stop and the air has all exhausted through the outlet 24 the springs 31 will then return the piston to its normal position and since the piston 28 is connected with the actuating lever 53 with which the piston 27 is connected the piston 26 will also be returned to its normal position. In order to prevent the danger of air accumulating in the pipe 23 and preventing the piston 26 from moving to the position shown in Fig. 3 the small opening 59 is provided. It should be noted that the opening 59 is so small that the air will not pass through the same rapidly enough to prevent the piston 26 from being moved to open outlet 24. It should also be noted that any other suitable type of outlet could be substituted for the outlet shown. After the pistons have returned to the normal position the air-brake system can be again filled with air and will again be ready for use after the cars have been put back upon the track.

I have therefore provided a mechanism automatically applying the brakes to a car in case the trucks jump the track, the device being so constructed that it will operate very efficiently and very rapidly and being also so constructed that the tappets after first engaging the rail or tie will be drawn upwardly out of the way and thus prevented from being broken or otherwise injured.

What is claimed is:—

1. The combination with an air-brake system of an exhaust device comprising a plurality of cylinders, one of said cylinders communicating with said air-brake system and the second cylinder communicating with said first mentioned cylinder, pistons slidably mounted in said cylinders and controlling the passage of air through the same, actuating means connected with said pistons, and means for yieldably holding said pistons in a normal position.

2. The combination with an air-brake system of an exhausting device including a plurality of communicating cylinders, one of said cylinders communicating with the air brake system, means for controlling the passage of air through said cylinders, means for yieldably holding said controlling means in a set position, operating means connected with said controlling means, and actuating means for said operating means moved to an operative position by engagement with the right of way over which a train passes.

3. The combination with an air-brake system of exhausting means including a cylinder communicating with said system, a second cylinder communicating with said first mentioned cylinder, pistons in said cylinders, means connected with said pistons for initially moving said pistons to permit air from said system to enter the cylinders and move said pistons longitudinally in said cylinders, and resilient means in said first mentioned cylinder for yieldably holding the piston thereof in a closed position and serving as means for returning the piston to a closed position after the air in said system has become exhausted.

4. The combination with an air-brake system of exhausting means including controlling pistons, piston rods extending from said pistons, a lever having one end portion connected with said pistons, rocker shafts, links pivotally connected with said rocker shafts, one of said links being connected with one of said piston rods and the other of said links being pivotally connected with said lever, arms carried by said rocker shafts and pivotally connected with said links, tappets, levers having their outer end portions connected with said tappets, and arms carried by said rocker shafts and connected with the inner end portions of said levers.

5. An air-brake system exhausting mechanism including cylinders, pistons slidably mounted in said cylinders, piston rods extending from said pistons through said cylinders, an actuating lever connected with said piston rods, rocker shafts, links pivotally connected with said rocker shafts and with said lever, pivotally mounted levers, arms extending from said rocker shafts and pivotally connected with the inner end portions of said levers, and tappets connected with the outer end portions of said pivotally mounted levers.

6. The combination with an air-brake system of a main cylinder communicating with one of the pipes of said air-brake system and provided with a valve seat at its inner end, a piston slidably mounted in said cylinder and provided at one end with a reduced extension forming a valve head engaging said valve seat when said piston is in a normal position, a piston rod extending from said piston through said cylinder, an abutment surrounding said piston rod within said cylinder and adjustably engaging the walls of said cylinder, a spring positioned about said piston rod between said piston and abutment, an auxiliary cylinder, a conduit leading from said auxiliary cylinder and communicating with said main cylinder and having its inlet end closed by said piston when the piston is in the normal position, a piston slidably mounted in said auxiliary cylinder and closing an outlet for said auxiliary cylinder when in a normal position, a piston rod extending from the piston of said auxiliary cylinder, an actuating lever connected with the outer ends of said piston rods, and means for moving said actuating lever to move said pistons in said cylinders and move said valve head out of engagement with said valve seat.

7. The combination with an air-brake system of a main cylinder communicating with said air-brake system and provided with an outlet and having its inlet provided with a valve seat, a piston slidably mounted in said main cylinder and provided with a relatively small valve head, a piston rod extending from said piston through said cylinder, resilient means yieldably holding said piston in a normal position to close the outlet of said cylinder and hold said valve head in engagement with said valve seat, an auxiliary cylinder communicating with the outlet of said main cylinder and provided with an outlet, a piston slidably mounted in said auxiliary cylinder and closing the outlet thereof when in a normal position, a piston rod extending from said last mentioned piston through said auxiliary cylinder, an actuating lever connected with said piston rods, and means for giving said lever sufficient movement to move said pistons in said cylinders and move said valve head out of engagement with said valve seat.

In testimony whereof I affix my signature in presence of two witnesses.

WILLIAM C. RENSHAW.

Witnesses:
C. EVERETT LANCASTER,
ROSS J. WOODWARD.